(12) United States Patent
Seong et al.

(10) Patent No.: US 9,583,741 B2
(45) Date of Patent: Feb. 28, 2017

(54) SECONDARY BATTERY

(71) Applicant: SAMSUNG SDI CO., LTD., Yongin-si, Gyeonggi-do (KR)

(72) Inventors: Jaeil Seong, Yongin-si (KR); Hideaki Yoshio, Yongin-si (KR); Jiwon Yun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 448 days.

(21) Appl. No.: 14/059,434

(22) Filed: Oct. 21, 2013

(65) Prior Publication Data

US 2015/0010809 A1 Jan. 8, 2015

Related U.S. Application Data

(60) Provisional application No. 61/843,305, filed on Jul. 5, 2013.

(51) Int. Cl.
*H01M 2/02* (2006.01)

(52) U.S. Cl.
CPC ............ *H01M 2/0217* (2013.01); *H01M 2/02* (2013.01); *H01M 2/0207* (2013.01); *H01M 2002/0205* (2013.01); *H01M 2002/0297* (2013.01); *H01M 2200/20* (2013.01)

(58) Field of Classification Search
CPC .... H01M 2/02; H01M 2/0207; H01M 2/0217; H01M 2002/0205
USPC ................................................. 429/163, 176
See application file for complete search history.

(56) References Cited

U.S. PATENT DOCUMENTS

| | | | |
|---|---|---|---|
| 2006/0141354 A1 | 6/2006 | Kwon | |
| 2010/0236854 A1* | 9/2010 | Nakamura | B60K 1/04 180/68.5 |
| 2011/0123854 A1 | 5/2011 | Kim | |

FOREIGN PATENT DOCUMENTS

| | | |
|---|---|---|
| EP | 2 273 584 A1 | 1/2011 |
| EP | 2 551 935 A1 | 1/2013 |
| JP | 2002-025525 A | 1/2002 |
| KR | 10-2006-0059705 A | 6/2006 |
| KR | 10-2006-0027270 A | 3/2007 |

OTHER PUBLICATIONS

EPO Search Report dated Oct. 29, 2014, for corresponding European Patent application 13191048.1, (6 pages).
Patent Abstracts of Japan with English Machine Translation of JP 2002-025525 A, 13 pages.

\* cited by examiner

*Primary Examiner* — Basia Ridley
*Assistant Examiner* — James Erwin
(74) *Attorney, Agent, or Firm* — Lewis Roca Rothgerber Christie LLP

(57) ABSTRACT

A secondary battery including an electrode assembly and a case accommodating the electrode assembly, the case including a bottom surface, a first pair of parallel sidewalls and a second pair of parallel sidewalls, connected with the bottom surface, and a corner portion formed by an intersection of each of the first pair of parallel sidewalls and the bottom surface, the corner portion having a first radius of curvature at a first region, and a second radius of curvature different from the first radius of curvature at a second region.

19 Claims, 6 Drawing Sheets

SECONDARY BATTERY

CROSS-REFERENCE TO RELATED APPLICATION

This application claims priority to and the benefit of U.S. Provisional Application No. 61/843,305, filed on Jul. 5, 2013 in the U.S. Patent and Trademark Office, the entire content of which is incorporated herein by reference.

1. Field

The embodiments of the present invention relate to a secondary battery.

2. Description of the Related Art

A voltage surge may occur to a secondary battery due to, e.g., a short circuit occurring internal or external to the electrode assembly, overcharging, or overdischarging. Excessive heat generated due to the voltage surge may cause a fire or an explosion. Therefore, it is important to test the safety of the secondary battery.

In safety tests on secondary batteries, the secondary batteries are tested for fires and explosions under electrical conditions, such as, cell short-circuiting, abnormal charging, overcharging and forced discharging, and under physical conditions such as, vibration and shock. Particularly, in a longitudinal compression test of a secondary battery, pressure may be abruptly applied from the outside of the secondary battery to two opposing sides of the battery can, and the safety of the battery relative to the deformation is examined. When a secondary battery is longitudinally compressed, a short circuit between an active material of a positive electrode plate and an active material of a negative electrode plate may occur due to deformation of the electrode assembly, resulting in ignition and explosion of the secondary battery.

SUMMARY

An aspect of an embodiment provides a secondary battery which can improve safety by allowing a can to be deformed in a predetermined manner during, for example, a longitudinal compression test.

In accordance with a first aspect of an embodiment of the present invention, a secondary battery is described, including an electrode assembly, and a case accommodating the electrode assembly, the case including a bottom surface, a first pair of parallel sidewalls having a first width and being connected with the bottom surface, a second pair of parallel sidewalls having a second width smaller than the first width and being connected with the bottom surface and a corner portion formed by an intersection of each of the first pair of parallel sidewalls and the bottom surface, the corner portion having a first radius of curvature at a first region, and a second radius of curvature different from the first radius of curvature at a second region.

The corner portion may include an inner corner portion formed at an interior of the case and an outer corner portion formed at an exterior of the case, and wherein a radius of curvature of the inner corner portion at the first region is different from a radius of curvature of the outer corner portion at the first region.

The radius of curvature of the inner corner portion may be greater than the radius of curvature of the outer corner portion.

The radius of curvature of the inner corner portion may be less than the radius of curvature of the outer corner portion.

The inner corner portion may form a recessed portion in the bottom surface at the first region.

The recessed portion may include a stepped surface.

The first radius of curvature may be greater than the second radius of curvature, and may form a groove at the first region.

A thickness of the bottom surface at the first region may be about 65% to about 95% of a thickness of the bottom surface at the second region.

The corner portion may include two second regions and the first region may be located between the two second regions.

The first region may extend along about 1% to about 35% of the first width.

The corner portion may include an inner corner portion formed at an interior of the case and an outer corner portion formed at an exterior of the case, and the radius of curvature of the inner corner portion at the first region may be substantially equal to the radius of curvature of the outer corner portion at the first region.

The corner portion may include an inner corner portion formed at an interior of the case and an outer corner portion formed at an exterior of the case, and the radius of curvature of the outer corner portion at the first and the second region is substantially equal to the radius of curvature of the inner corner portion at the second region.

The corner portion may include an inner corner portion formed at an interior of the case and an outer corner portion formed at an exterior of the case, and the radius of curvature of the inner corner portion at the first and the second region may be substantially equal to the radius of curvature of the outer corner portion at the second region.

In accordance with a second aspect of an embodiment of the present invention, a secondary battery is described including an electrode assembly, and a case accommodating the electrode assembly, the case including a pair of longer side surfaces, a pair of shorter side surfaces, and a bottom portion connecting the pair of longer side surfaces and the pair of shorter side surfaces a cap assembly coupled to a top portion of the case, and a notched region formed at each corner portion formed where each of the pair of longer side surfaces and the bottom portion are coupled.

The notched region may be formed at a center region of the corner portion along each of the pair of longer side surfaces.

The corner portion may include an inner corner portion on an inner surface of the case and an outer corner portion on an outer surface of the case.

The notched region may be formed at the inner corner portion, and may form a groove extending from an inner surface of each of the pair of longer side surfaces to the bottom portion.

The notched region may be formed at the outer corner portion, and may form a groove extending from an outer surface of each of the pair of longer side surfaces to an outer surface of the bottom portion.

The notched region may include a first notched region and a second notched region, the first notched region being formed at the inner corner portion and the second notched region being formed at the outer corner portion, wherein the first notched region may form an inner groove extending from an inner surface of each of the pair of longer side surfaces to an inner surface of the bottom portion, and wherein the second notched region may form an outer groove extending from an outer surface of each of the pair of longer side surfaces to an outer surface of the bottom portion.

Accordingly, the secondary battery according to the aspects of the embodiment of the present invention can control a short circuit of the electrode assembly, thereby improving the safety of the secondary battery.

DETAILED DESCRIPTION

Example embodiments of the present invention will now be described in more detail with reference to accompanying drawings, such that those skilled in the art can easily practice the present invention.

Figure 1:
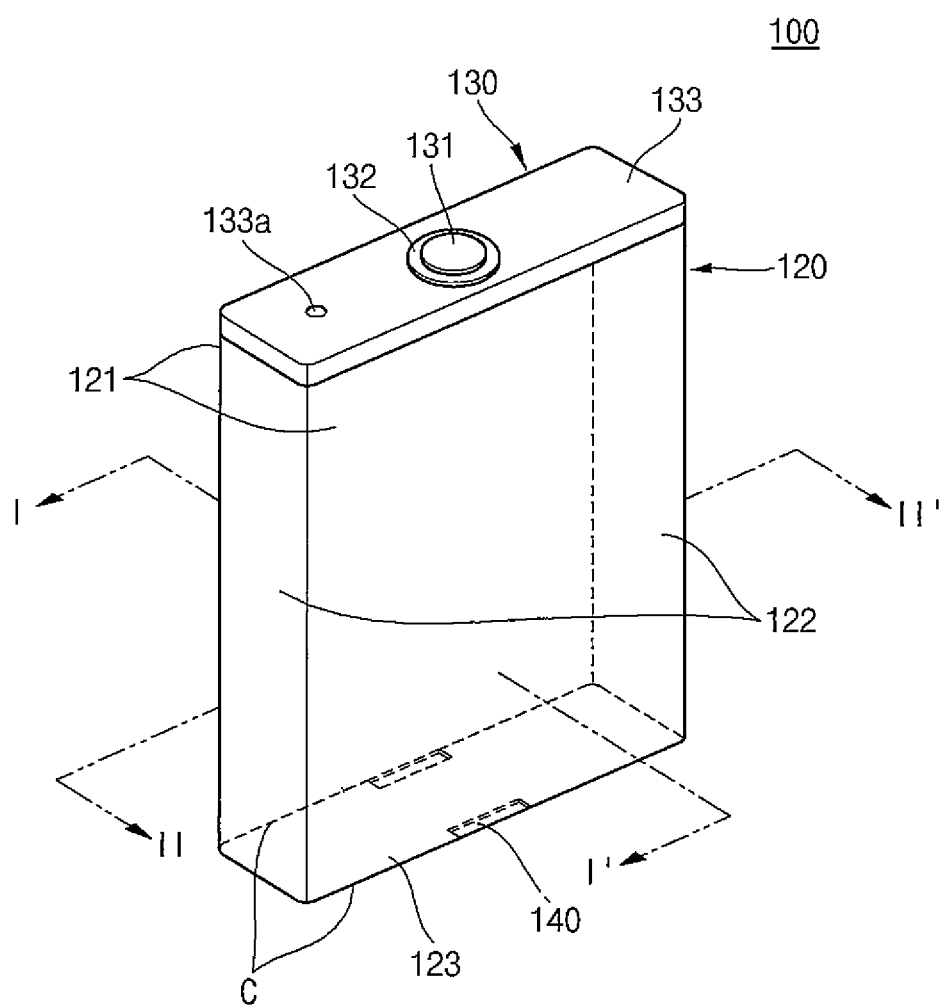
FIG. 1 is a perspective view of a secondary battery according to an embodiment of the present invention.
Figure 2:
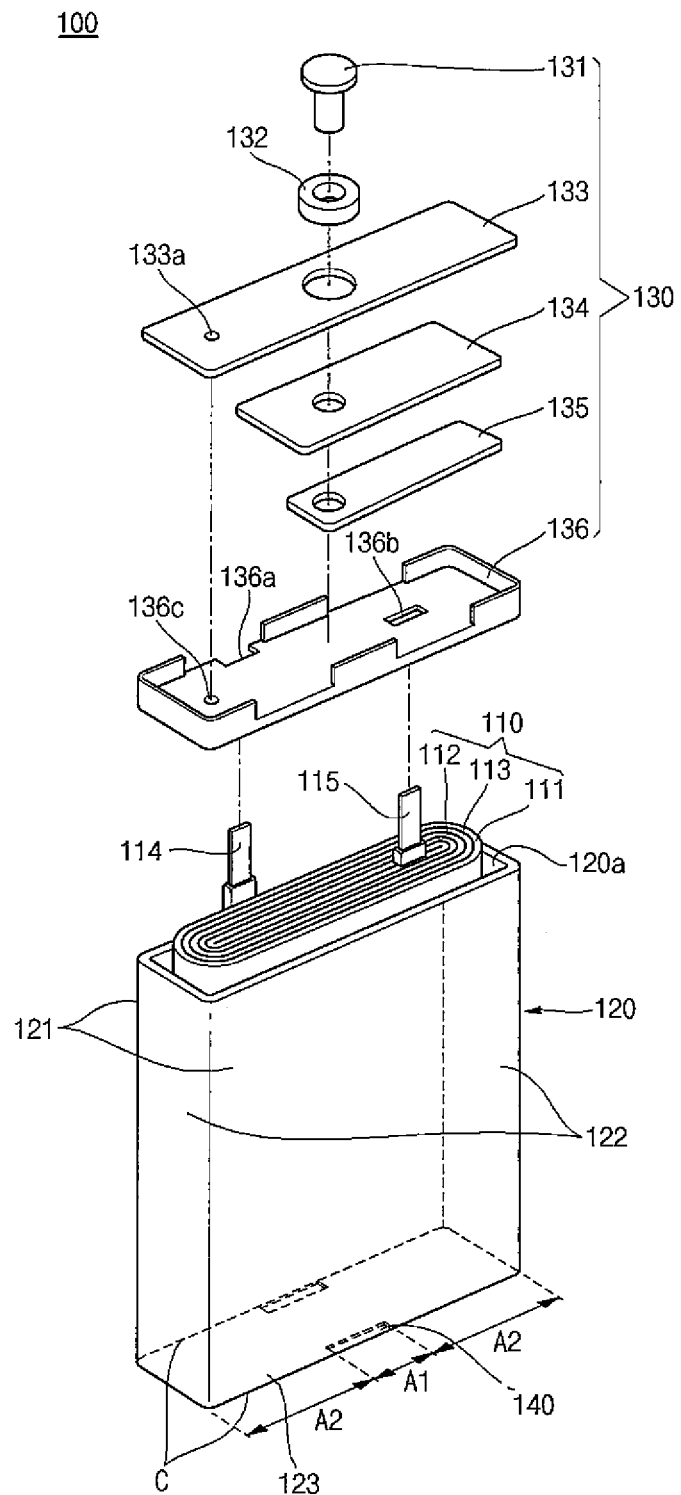
FIG. 2 is an exploded perspective view of the secondary battery shown in FIG. 1.
Figure 3A:
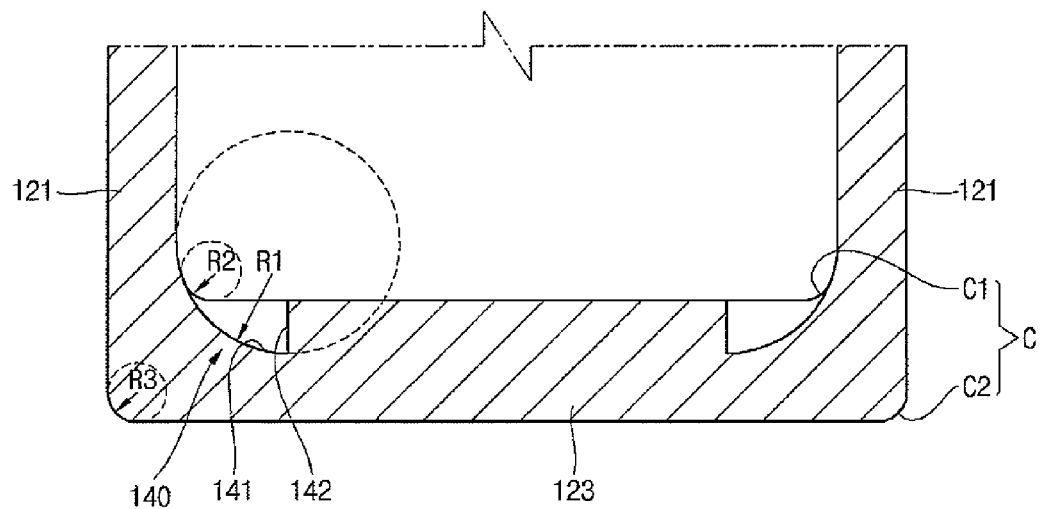
FIG. 3a is a sectional view taken along line I-I' of FIG. 1
Figure 3B:
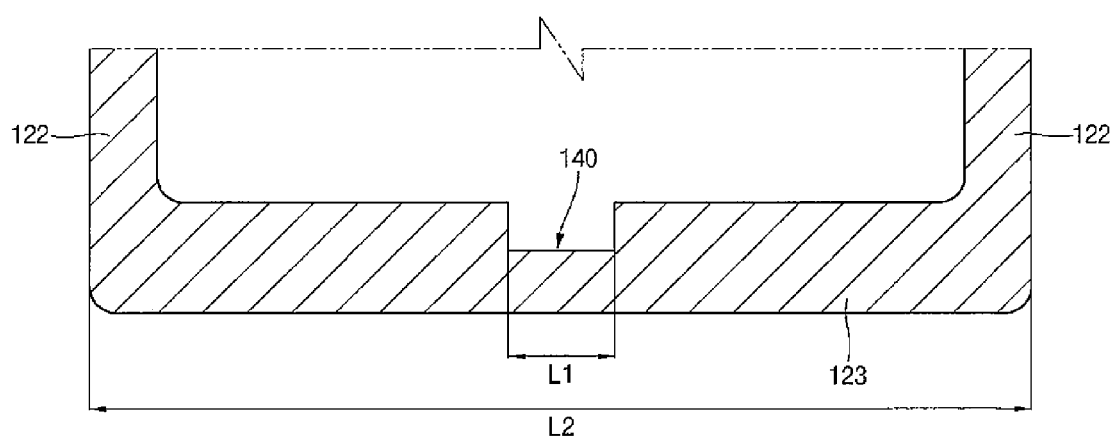
FIG. 3b is a sectional view taken along line II-II' of FIG. 1.

FIG. 1 is a perspective view of a secondary battery according to an embodiment of the present invention. FIG. 2 is an exploded perspective view of the secondary battery shown in FIG. 1. FIG. 3a is a sectional view taken along line I-I' of FIG. 1. FIG. 3b is a sectional view taken along line II-II' of FIG. 1.

Referring to FIGS. 1 and 2, the secondary battery according to the embodiment of the present invention includes an electrode assembly 110, a can 120 (also referred to as a "case" herein and used interchangeably), a cap assembly 130 and a deformed part 140.

The electrode assembly 110 includes a positive electrode plate 111 having a positive electrode collector coated with a positive electrode active material, a negative electrode plate 112 having a negative electrode collector coated with a negative electrode active material, and a separator 113 interposed between the positive electrode plate 111 and the negative electrode plate 112 to electrically insulate the positive and negative electrode plates 111 and 112. The electrode assembly 110 is formed by winding the positive electrode plate 111, the negative electrode plate 112 and the separator 113 in a configuration similar to a jelly roll. Here, the positive electrode plate 111 may be formed of an aluminum (Al) foil, the negative electrode plate 112 may be formed of a copper (Cu) foil, and the separator 113 may be formed of polyethylene (PE) or polypropylene (PP), but the embodiments of the present invention are not limited to the materials of the positive and negative electrode plates 111 and 112 and the separator 113 listed herein. In addition, a positive electrode tab 114 is coupled to the positive electrode plate 111 to protrude upward from a top portion of the electrode assembly 110, and a negative electrode tab 115 is coupled to the negative electrode plate 112 to protrude upward from the top portion of the electrode assembly 110.

The can 120 may have a substantially hexahedron shape with an opening 120a through which the electrode assembly 110 is accommodated. In more detail, the can 120 includes a pair of long side surfaces 121 facing each other and having relatively large areas, a pair of short side surfaces 122 facing each other and having relatively small areas, and a bottom surface 123 coupling the pair of long side surfaces 121 and the pair of short side surfaces 122. Here, the pair of "long" side surfaces means that it is longer with respect to the pair of "short" side surfaces, and the pair of "short" side surfaces means that it is shorter with respect to the pair of "long" side surfaces. Here, a portion of the can 120, where the pair of long side surfaces 121 and the bottom surface 123 meet, is defined as a corner portion C. The corner portion C includes a substantially centrally positioned first region A1 and a second region A2 positioned at its edge. The deformed part 140 is formed in the first region A1. The corner portion C will later be described in more detail.

According to an embodiment, the can 120 is formed by a deep drawing method. Therefore, the pair of long side surfaces 121, the pair of short side surfaces 122, and the bottom surface 123 are integrally formed. As shown in FIGS. 3a and 3b, the bottom surface 123 of the can 120 may be formed to be thicker than the thickness of the long side surface 121 and the short side surface 122. In some embodiments, the can 120 is made of aluminum or an aluminum alloy, which is light in weight and ductile. In addition, the inner surface of the case 120 may be treated to be insulated from the electrode assembly 110.

The cap assembly 130 is coupled to the opening 120a of the can 120. In some embodiments, the cap assembly 130 includes an electrode terminal 131, a gasket 132, a cap plate 133, an insulating plate 134, a terminal plate 135 and an insulation case 136.

The gasket 132 is placed between the electrode terminal 131 and the cap plate 133, and the electrode terminal 131 and the terminal plate 135 are electrically coupled to each other. The insulating plate 134 insulates the cap plate 133 from the terminal plate 135. An electrolyte injection hole 133a is formed at one side of the cap plate 133. In order to seal the electrolyte injection hole 133a after an electrolytic solution is inserted into the electrolyte injection hole 133a, a plug is installed in the electrolyte injection hole 133a. A safety vent configured to be opened to release internal gas when the internal pressure of the can 120 exceeds a preset pressure may be formed at the other side of the cap plate 133. The insulation case 136, which is formed in the opening 120a of the can 120, seals the can 120. The insulation case 136 may be made of a polymer resin having an insulating property, e.g., polypropylene (PP). Holes 136a and 136b are formed in the insulation case 136 and correspond to the location of the positive electrode tab 114 and the negative electrode tab 115 to allow the positive electrode tab 114 and the negative electrode tab 115 to pass through the holes 136a and 136b. In addition, an electrolyte passing hole 136c is formed in the insulation case 136 to be located to correspond to the electrolyte injection hole 133a.

The deformed part 140 is formed at the center of the corner portion C of the can 120 to allow the can 120 to be deformed in a predetermined direction during a longitudinal compression test. That is, because a longitudinal axis of the long side surface 121 formed along the deformed part 140 serves as a central axis during the longitudinal compression test, the can 120 may be deformed by the deformed part 140 in a predetermined direction. Here, in the longitudinal compression test of a secondary battery, pressure may be applied from the pair of short side surfaces 122 of the can 120 toward the center (as shown in FIG. 7B), and the safety of the secondary battery 100 is examined. In addition, because the deformed part 140 is formed at the center of opposite sides of the corner portion C, where the pair of long side surfaces 121 and the bottom surface 123 meet, a position of the central axis at which the can 120 is deformed during the longitudinal compression test can be more securely defined, so that when the can 120 is longitudinally compressed, the can 120 will deform along the central axis defined by the deformed part 140. Here, the can 120 may be deformed in opposite directions in view of the central axis. That is, referring to FIG. 2, the can 120 may be deformed such that the long side surface 121 positioned at the front of the can 120 (as illustrated in FIG. 2) or the long side surface 121 positioned at the rear of the can 120 (as illustrated in FIG. 2) get closer to each other. As described above, a short circuit of the electrode assembly 110 is controlled by allowing the can 120 to deform in a predetermined direction during the longitudinal compression test, thereby improving the safety of the secondary battery 100. Referring to FIGS. 3a and 3b according to an embodiment, the deformed part 140 is formed in the first region A1 of the corner portion C of the can 120. The corner portion C may include an inner corner C1 formed on the inner surface of the can 120 and an outer corner C2 formed on the outer surface of the can 120. The deformed part 140 is formed by forming a groove 141 from the inner corner CI to the bottom surface 123. Therefore, a thickness of the bottom surface 123 at the deformed part 140 is smaller than a thickness of the bottom surface 123 at a region around the deformed part 140 (e.g., second region A2). In some embodiments, a stepped surface 142 is formed at a portion where the deformed part 140 and the bottom surface 123 meet. Here, a thickness of the bottom surface 123 may be, for example, approximately 0.5 mm, and a thickness of the bottom surface at the deformed part 140 having the stepped surface 142 may be, for example, approximately 0.4 mm. If the thickness of the deformed part 140 is larger than approximately 0.4 mm, there is no significant difference between the thicknesses of the deformed part 140 and the bottom surface 123. Therefore, during the longitudinal compression test, it is not possible (or may be difficult) to cause the can 120 to be deformed in a predetermined direction in view of the deformed part 140. In addition, if the thickness of the deformed part 140 is less than approximately 0.4 mm, the can 120 may be easily deformed due to a minor external shock. Therefore, the thickness of the deformed part 140 is preferably approximately 65% to 95%, and preferably approximately 80%, of the thickness of the bottom surface 123.

In some embodiments, an inner radius of curvature R1 of the deformed part 140 (first region A1) is made to be greater than an inner radius of curvature R2 of the second region A2 of the corner portion C (R1>R2). In addition, the inner radius of curvature R1 of the deformed part 140 is made to be greater than an outer radius of curvature R3 of the deformed part 140 (R1>R3). Here, the inner radius of curvature R2 of the second region A2 is equal to the outer radius of curvature R3 of the deformed part 140 (R2=R3). That is, the deformed part 140 is formed such that the inner radius of curvature R1 of the deformed part 140 and the outer radius of curvature R3 are different from each other, and the inner radius of curvature R1 of the deformed part 140 is greater than the outer radius of curvature R3.

In some embodiments, a length L1 of the first region A1 having the deformed part 140 is approximately 1% to 35%, preferably approximately 15%, of an overall length L2 of the bottom surface 123. For example, if the overall length L2 of the bottom surface 123 is 51 mm, the length L1 of the deformed part 140 is approximately 1 mm to 18 mm, preferably approximately 8 mm. Here, if the length L1 of the deformed part 140 is less than about 1% of the overall length L2 of the bottom surface 123, it is not enough to deform the can 120 with respect to the deformed part 140 during the longitudinal compression test. Therefore, the can 120 may not deform in the predetermined direction. On the other hand, if the length of the deformed part 140 exceeds 35% of the overall length L2 of the bottom surface 123, the can 120 may deform in many directions in the deformed part 140 during the longitudinal compression test. Accordingly, it is not possible (or may be difficult) to allow the can 120 to deform in the predetermined direction.

As described in the embodiment above, the secondary battery 100 according to the embodiment of the present invention includes the deformed part 140 having its inner radius of curvature R1 greater than its outer radius of curvature R3 formed at the center of the corner portion C, where the long side surfaces 121 and the bottom surface 123 of the can 120 meet, thereby allowing the can 120 to be deformed in the predetermined direction during the longitudinal compression test. Thus, the secondary battery 100 according to the embodiment of the present invention can control a short circuit of the electrode assembly 110, thereby improving the safety of the secondary battery 100.

Figure 4:
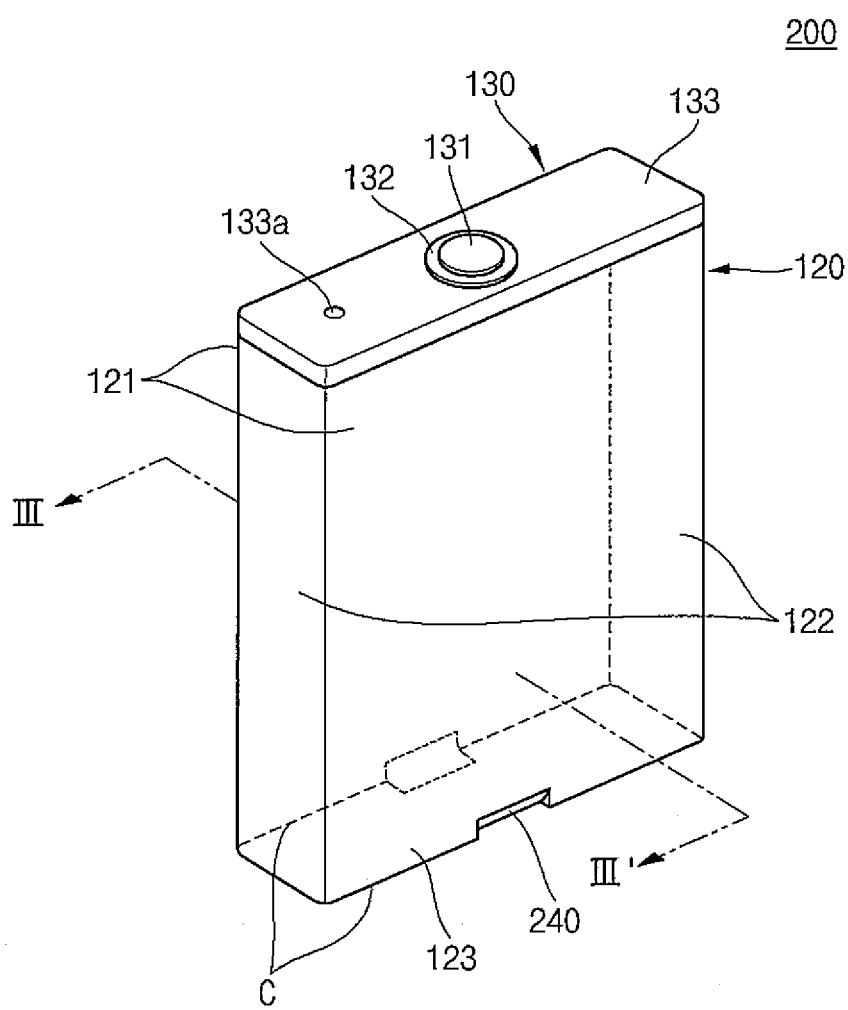
FIG. 4 is a perspective view of a secondary battery according to another embodiment of the present invention.
Figure 5:
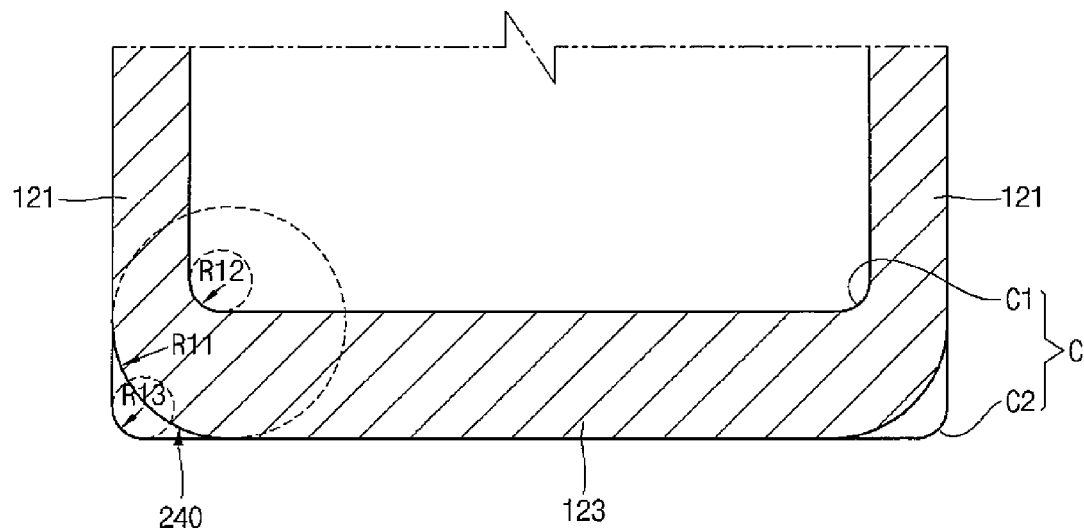
FIG. 5 is a sectional view taken along line III-III' of FIG. 4.

FIG. 4 is a perspective view of a secondary battery according to another embodiment of the present invention, and FIG. 5 is a sectional view taken along line III-III' of FIG. 4.

The secondary battery 200 shown in FIG. 4 is substantially the same as the secondary battery 100 shown in FIG. 1, except for the configuration of the deformed part 140. Thus, the following description will focus on the deformed part 240 shown in FIG. 4.

Referring to FIGS. 4 and 5, the secondary battery 200 according to another embodiment of the present invention includes an electrode assembly 110, a can 120, a cap assembly 130 and the deformed part 240.

According to the embodiment, the deformed part 240 is formed in a first region A1 of a corner portion C of the can 120. The corner portion C includes an inner corner C1 formed on an inner surface of the can 120 and an outer corner C2 formed on an outer surface of the can 120. The deformed part 240 is formed by forming a curved portion such that the outer corner C2 is recessed toward the inner corner C1. In addition, when viewed from the outside of the can 120, the deformed part 240 is formed to be recessed toward the inside of the can 120. Therefore, the thickness of the corner portion C at the deformed part 240 is smaller than a thickness of the corner portion C around the deformed part 240.

In some embodiments, an outer radius of curvature R11 of the deformed part 240 is made to be greater than an outer radius of curvature R13 of the second region A2 of the corner portion C (R11>R13). In addition, the outer radius of curvature R11 of the deformed part 240 is made to be greater than an inner radius of curvature R12 of the deformed part 240 (R11>R12). Here, the outer radius of curvature R13 of the second region A2 is equal to the inner radius of curvature R12 of the first region A1 and the second region A2 (R13=R12). That is, the deformed part 240 is formed such that the inner radius of curvature R12 and the outer radius of curvature R11 are different from each other at the first region A1, and the outer radius of curvature R11 at the first region A1 is greater than the inner radius of curvature R12 at the first region A1 and the second region A2.

As described above, the secondary battery 200 according to an embodiment of the present invention includes the deformed part 240 having its outer radius of curvature R11 greater than its inner radius of curvature R12 formed at the center of the corner portion C, where the long side surfaces 121 and the bottom surface 123 of the can 120 meet, thereby allowing the can 120 to be deformed in the predetermined direction during the longitudinal compression test. Accordingly, the secondary battery 200 according to an embodiment of the present invention can control a short circuit of the electrode assembly 110, thereby improving the safety of the secondary battery 200.

Figure 6:
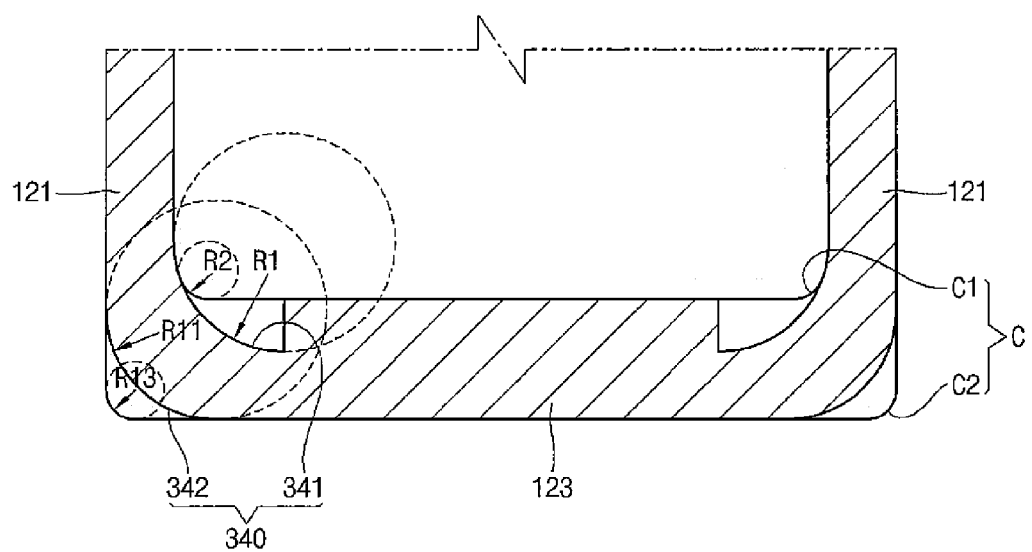
FIG. 6 is a sectional view illustrating a deformed part according to another embodiment.

FIG. 6 is a sectional view illustrating a deformed part according to another embodiment. Here, the sectional view of FIG. 6 illustrates a part corresponding to the sectional view of FIG. 5.

Referring to FIG. 6, the deformed part 340 is formed at a first region A1 of the corner portion C of the can 120. The corner portion C includes an inner corner C1 formed at an inner surface of the can 120 and an outer corner C2 formed at an outer surface of the can 120. In more detail, the deformed part 340 includes a groove 341 from the inner corner C1 to a bottom surface 123 and a curved portion 342 recessed from the outer corner C2 toward the inner corner C1. That is, the deformed part 340 is a combination of the deformed part 140 shown in FIG. 3a and the deformed part 240 shown in FIG. 5.

According to an embodiment, an inner radius of curvature R1 of the deformed part 340 is made to be greater than an inner radius of curvature R2 of the second region A2 of the corner portion C (R1>R2). In addition, an outer radius of curvature R11 of the deformed part 340 is made to be greater than an outer radius of curvature R13 of the second region A2 of the corner portion C (R11>R13). Here, the inner radius of curvature R1 of the deformed part 340 is equal to the outer radius of curvature R11 of the deformed part 340 (R1=R11), and the inner radius of curvature R2 of the second region A2 is equal to the outer radius of curvature R13 of the second region A2 (R2=R13). That is, the deformed part 340 is formed such that the inner radius of curvature R1 is equal to the outer radius of curvature R11 and the inner/outer radius of curvatures R1 and R11 of the deformed part 340 are greater than inner/outer radius of curvatures R2 and R13 of the second region A2, respectively.

Figure 7A:
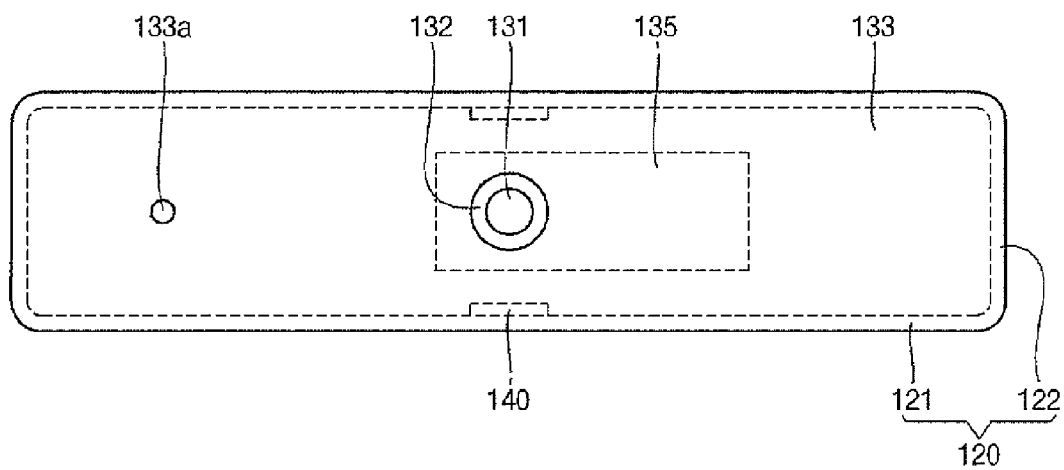
FIG. 7a is a plan view of the secondary battery shown in FIG. 1.
Figure 7B:
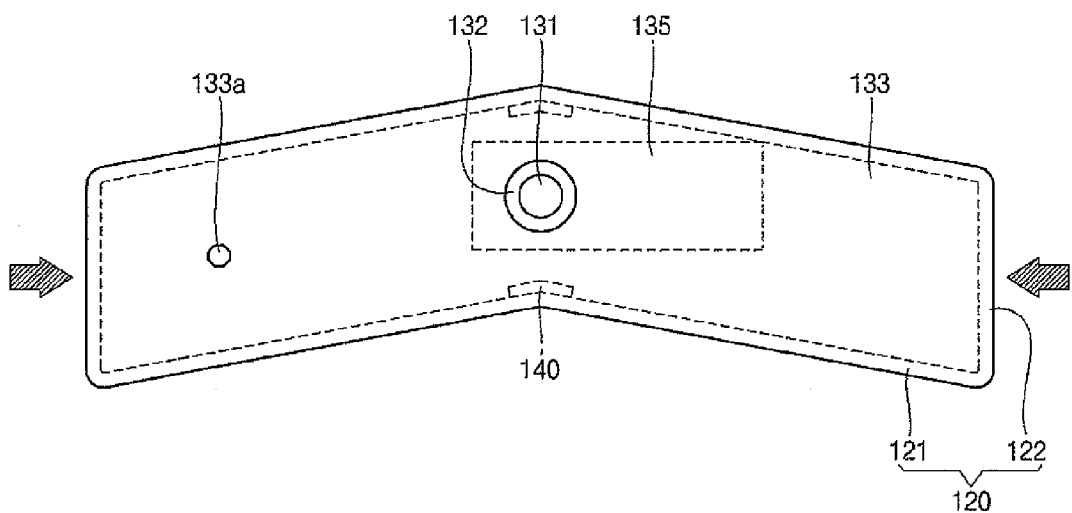
FIG. 7b is a plan view illustrating a state in which the secondary battery shown in FIG. 1 is longitudinally compressed.

FIG. 7a is a plan view of the secondary battery shown in FIG. 1. FIG. 7B is a plan view illustrating a state in which the secondary battery shown in FIG. 1 is longitudinally compressed.

Referring to FIGS. 7a and 7b, in the secondary battery 100 according to an embodiment of the present invention, the electrode terminal 131 is electrically coupled to the terminal plate 135, and is insulated from the cap plate 133 by the gasket 132. The cap plate 133 is electrically coupled to the can 120. In addition, the terminal plate 135 is spaced from the pair of long side surfaces 121 and the pair of short side surfaces 122. That is, the electrode terminal 131 and the terminal plate 135 have the same polarity (e.g., a negative polarity), and the cap plate 133 and the can 120 have the opposite polarity (e.g., a positive polarity).

In such a state, if a pressure is applied from each of the pair of short side surfaces 122 toward the center of the can 120 to perform, for example, a longitudinal compression test, the can 120 is deformed at the deformed part 140 formed on the long side surface 121 as the central axis of the deformation as shown in FIG. 7b. Here, the terminal plate 135 is shorted (e.g., short-circuit) to the long side surface 121 of the can 120, so that a discharge of current is rapidly performed, thereby preventing an accident of the secondary battery 100, such as ignition or explosion, due to overheating of the electrode assembly 110. As described above, because the deformed part 140 allows the can 120 to be deformed in a predetermined direction during a longitudinal compression test, short-circuiting of the electrode assembly 110 can be controlled, thereby improving the safety of the secondary battery 100.

While the secondary battery of the invention has been described in connection with various example embodiments, it will be understood by those skilled in the art that the invention is not limited to the disclosed embodiments, but rather, is intended to cover various modifications included within the spirit and scope of the appended claims and equivalents thereof.

| Explanation of Reference Numerals | |
|---|---|
| 100: Secondary battery | 110: Electrode assembly |
| 120: Can (or case) | 121: Long side surface |
| 122: Short side surface | 123: Bottom surface |
| 130: Cap assembly | 140, 240, 340: Deformed part |

What is claimed is:

1. A secondary battery comprising:
an electrode assembly; and
a case accommodating the electrode assembly, the case comprising:
a bottom surface;
a first pair of parallel sidewalls having a first width and being connected with the bottom surface, the electrode assembly being located between the first pair of parallel sidewalls;
a second pair of parallel sidewalls having a second width smaller than the first width and being connected with the bottom surface, the electrode assembly being located between the second pair of parallel sidewalls, each sidewall of the second pair of parallel sidewalls being connected to each sidewall of the first pair of parallel sidewalls; and
a corner portion formed by an intersection of each of the first pair of parallel sidewalls and the bottom surface, the corner portion having a first radius of curvature at a first region along an edge of the corner portion, and a second radius of curvature different from the first radius of curvature at a second region adjacent the first region along the edge of the corner portion.

2. The secondary battery of claim 1,
wherein the corner portion comprises an inner corner portion formed at an interior of the case and an outer corner portion formed at an exterior of the case, and
wherein a radius of curvature of the inner corner portion at the first region is different from a radius of curvature of the outer corner portion at the first region.

3. The secondary battery of claim 2, wherein the radius of curvature of the inner corner portion is greater than the radius of curvature of the outer corner portion.

4. The secondary battery of claim 2, wherein the radius of curvature of the inner corner portion is less than the radius of curvature of the outer corner portion.

5. The secondary battery of claim 2, wherein the inner corner portion forms a recessed portion in the bottom surface at the first region.

6. The secondary battery of claim 5, wherein the recessed portion comprises a stepped surface.

7. The secondary battery of claim 1, wherein the first radius of curvature is greater than the second radius of curvature, and forms a groove at the first region.

8. The secondary battery of claim 1, wherein a thickness of the bottom surface at the first region is about 65% to about 95% of a thickness of the bottom surface at the second region.

9. The secondary battery of claim 1, wherein the corner portion comprises two second regions and wherein the first region is located between the two second regions.

10. The secondary battery of claim 1, wherein the first region extends along about 1% to about 35% of the first width.

11. The secondary battery of claim 1,
wherein the corner portion comprises an inner corner portion formed at an interior of the case and an outer corner portion formed at an exterior of the case, and
wherein the radius of curvature of the inner corner portion at the first region is substantially equal to the radius of curvature of the outer corner portion at the first region.

12. The secondary battery of claim 1,
wherein the corner portion comprises an inner corner portion formed at an interior of the case and an outer corner portion formed at an exterior of the case, and
wherein the radius of curvature of the outer corner portion at the first and the second region is substantially equal to the radius of curvature of the inner corner portion at the second region.

13. The secondary battery of claim 1,
wherein the corner portion comprises an inner corner portion formed at an interior of the case and an outer corner portion formed at an exterior of the case, and
wherein the radius of curvature of the inner corner portion at the first and the second region is substantially equal to the radius of curvature of the outer corner portion at the second region.

14. A secondary battery comprising:
an electrode assembly; and
a case accommodating the electrode assembly, the case comprising:
a pair of longer side surfaces;
a pair of shorter side surfaces; and
a bottom portion connecting the pair of longer side surfaces and the pair of shorter side surfaces;
a cap assembly coupled to a top portion of the case; and
a notched region formed at each corner portion formed where each of the pair of longer side surfaces and the bottom portion are coupled.

15. The secondary battery according to claim 14, wherein the notched region is formed at a center region of the corner portion along each of the pair of longer side surfaces.

16. The secondary battery according to claim 14, wherein the corner portion comprises an inner corner portion on an inner surface of the case and an outer corner portion on an outer surface of the case.

17. The secondary battery according to claim 16, wherein the notched region is formed at the inner corner portion, and forms a groove extending from an inner surface of each of the pair of longer side surfaces to an inner surface of the bottom portion.

18. The secondary battery according to claim 16, wherein the notched region is formed at the outer corner portion, and forms a groove extending from an outer surface of each of the pair of longer side surfaces to an outer surface of the bottom portion.

19. The secondary battery according to claim 16,
wherein the notched region comprises a first notched region and a second notched region, the first notched region being formed at the inner corner portion and the second notched region being formed at the outer corner portion,
wherein the first notched region forms an inner groove extending from an inner surface of each of the pair of longer side surfaces to an inner surface of the bottom portion, and
wherein the second notched region forms an outer groove extending from an outer surface of each of the pair of longer side surfaces to an outer surface of the bottom portion.

* * * * *